W. C. AYLARD & J. P. PETTY.
MACHINE FOR KNOCKING UP SHEETS AND THE LIKE, PARTICULARLY PAPER SHEETS.
APPLICATION FILED NOV. 23, 1914.

1,279,493.

Patented Sept. 24, 1918.
6 SHEETS—SHEET 1.

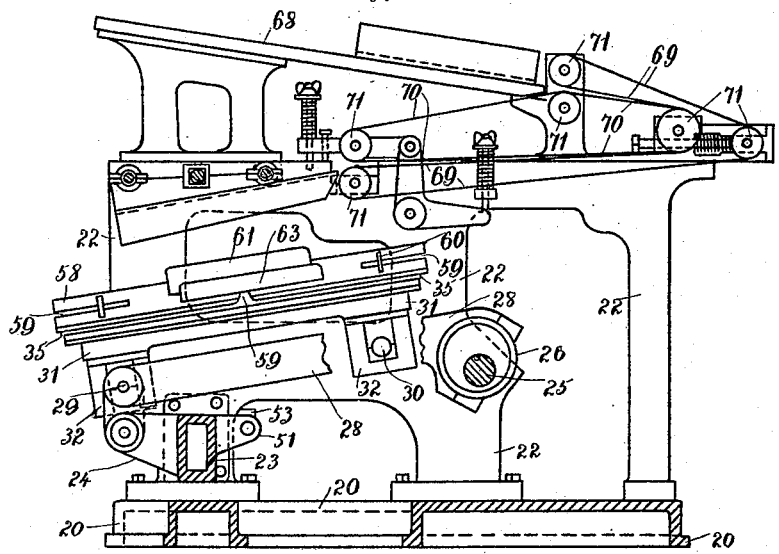

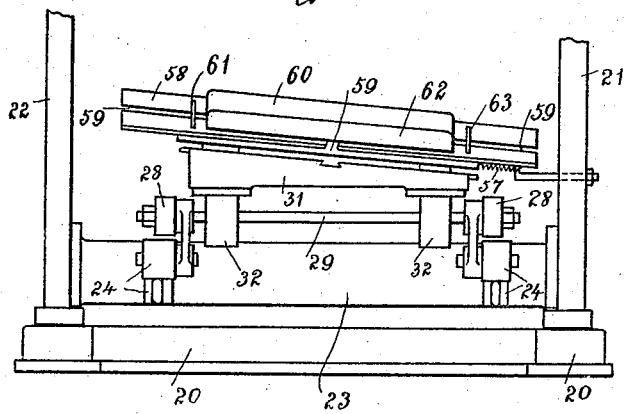
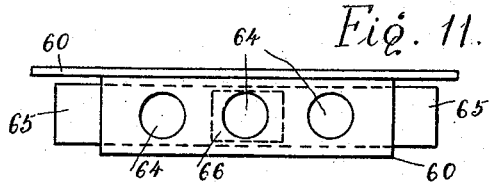
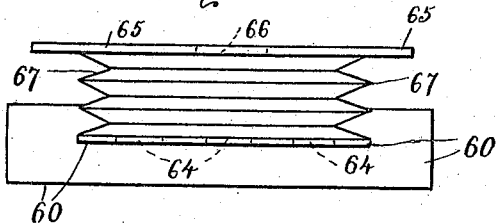

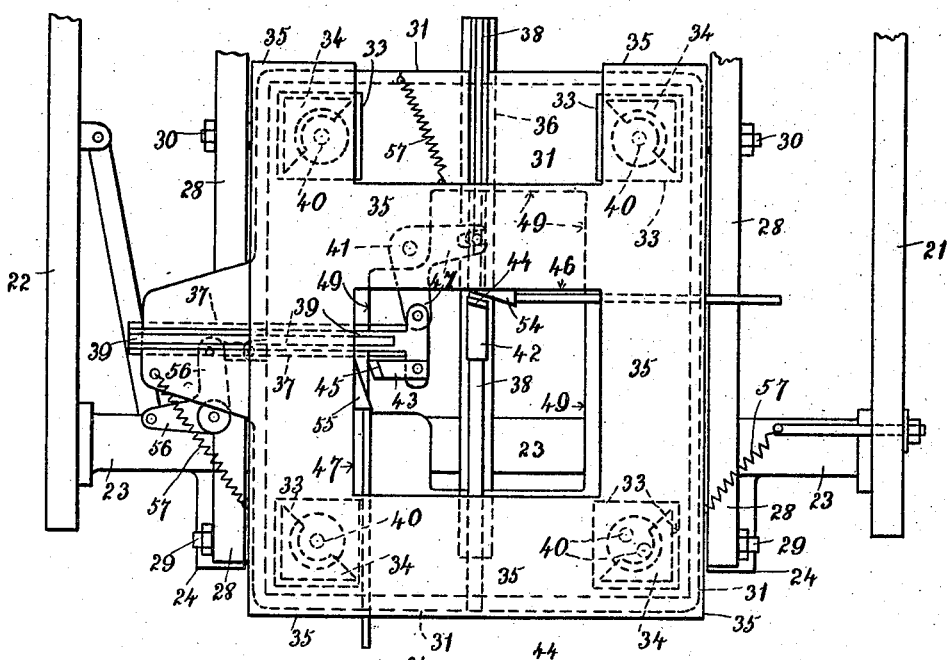

W. C. AYLARD & J. P. PETTY.
MACHINE FOR KNOCKING UP SHEETS AND THE LIKE, PARTICULARLY PAPER SHEETS.
APPLICATION FILED NOV. 23, 1914.

1,279,493.

Patented Sept. 24, 1918.
6 SHEETS—SHEET 5.

W. C. AYLARD & J. P. PETTY.
MACHINE FOR KNOCKING UP SHEETS AND THE LIKE, PARTICULARLY PAPER SHEETS.
APPLICATION FILED NOV. 23, 1914.

1,279,493.

Patented Sept. 24, 1918.
6 SHEETS—SHEET 6.

UNITED STATES PATENT OFFICE.

WILLIAM CHRISTOPHER AYLARD AND JOHN PAXTON PETTY, OF READING, ENGLAND.

MACHINE FOR KNOCKING UP SHEETS AND THE LIKE, PARTICULARLY PAPER SHEETS.

1,279,493.                    Specification of Letters Patent.    Patented Sept. 24, 1918.

Application filed November 23, 1914. Serial No. 873,597.

*To all whom it may concern:*

Be it known that we, WILLIAM CHRISTOPHER AYLARD and JOHN PAXTON PETTY, subjects of His Majesty the King of England, residing at Reading, in the county of Berkshire, England, have invented new and useful Improvements in Means for Knocking Up Sheets and the like, Particularly Paper Sheets, of which the following is a specification.

The present invention deals with means for mechanically performing the process generally known as "knocking up" sheets of paper and like articles delivered from printing or other machinery or for other like operations. For effecting this purpose we propose to adopt means to keep sheets of paper or other like objects in a "live" or vibratory condition during the whole or a considerable portion of the time employed in "knocking up" while at the same time employing means for directing the sheets toward the lay edge or edges or their equivalent, which last object may be very conveniently attained by inclining the board or the like on which the sheets lie toward such edge or edges or may be obtained by the action of moving joggers or fences, neither of which method is, of course, in itself new. The "live" or vibratory condition of the sheets may be obtained by acting on the board either directly or indirectly by any means which will transmit to the sheets the necessary vibration.

By the term a "live" condition when used in the specification is meant a condition in which the sheets do not lie or slide over each other with an even surface but where on the contrary there are a series of waves or vibrations produced in the sheets which cause at any rate the upper sheets of the pile to have slight local movements especially in a vertical direction which either by breaking adhesion or otherwise facilitates the movement of these sheets in any desired direction. The object of the apparatus employed is to produce such "live" condition and therefore the mounting of the board or the like or the means of acting on it may vary greatly. For heavier work we find it preferable to employ a spring mounting or its equivalent for the board while for lighter work such spring mounting may be unnecessary, as a non-spring mounted board of suitable construction may yet be able to vibrate sufficiently to produce the necessary "live" condition.

The vibrations are obtained by communicating to the board a series of impulses, as for example by delivering blows or by suddenly checking its movement. The number of such impulses necessarily varies with the construction of the board and with the number and weight of the sheets being "knocked up" and where the board is not spring mounted a greater number of impulses in a given time is generally required than where spring mounting is used.

A convenient construction is mounting the board elastically at the corners on cylindrical spiral compression springs, or hanging it from tension springs, or mounting the board centrally on a universal joint with cylindrical tension springs pulling under the table at the corners. Such board may be subjected to alternating blows the direction of which lie in the same or different vertical planes or at different points of the board or the board may be subjected to suddenly arrested tilting movements.

Again we may employ a series of cams under the table with which a revolving organ co-acts to impart a series of jumps or impulses or suddenly arrested tilting movements to the table; and by making the fall off edges of the cams steep the blows resulting from the revolving organ leaving any cam is emphasized. In the hereinafter described embodiment of this form of board, suddenly arrested tilting movements in different vertical planes are given to the board, but such tilting movements may be in one vertical plane only.

In any case either by the movement of the board to secure the blows, or otherwise by a special movement of the board, there may be accompanying general movement of the sheets in the plane of the board, the general movement preferred being an orbital or eccentric movement. Such a general movement of the sheets has the effect of tapping them against the lay fences with which the board is furnished and will serve to give a drawing away movement of the sheets from the fences which will serve to automatically position any sheet which may fall with one of its edges or side marginal portions resting against the side of any fence.

Liveliness of the sheets to give a minimum resistance to movement up to the lay corner may be promoted by giving the board somewhat yielding blows such as would be imparted by tapping or striking with or against a hollow organ having an elastic wall inclosing air, or with or against solid or perforate elastic heads or stops. Some or all of the edges or fences may be made in perforated or grilled form and the process may be assisted by means of blasts of air produced by convenient mechanism. The blows or movements may be parallel with the board or oblique or normal to this or an association or a combination of all or any of these may be effected.

The sheets or the like are preferably fed to the board or to the receptacle in the form of a stream of overlapping sheets in which the top sheet is first taken in by the feeder and is thereafter turned over for individual delivery or dropping onto the board, but a suitable number of the sheets may be dropped or placed simultaneously upon the board or into the receptacle, or the sheets may be so fed upon the board or into the receptacle that a gap exists between each sheet and that immediately preceding and succeeding it, the feeding of the sheets in the form of a stepped sequence as before described being preferable as a greater number of sheets can be "knocked up" in a given time.

In order to secure a proper continuous feeding of the sheets an air blast or air current may be introduced under the sheets as they are fed onto the board so that in cases where the stepped sequence of sheets is for any reason interrupted the sheet immediately following the gap is prevented from overtaking the preceding sheet and passing thereunder to fold it over on itself. In a convenient arrangement for this purpose the movable fence or jogger in the line of the feed is attached to a bellows to thereby automatically produce the air blast or air current as it moves back and forth.

For the purpose of compensating for various weights of paper the expedient is preferably adopted of arranging for the force of the blows to be adjustable, one convenient arrangement under the control of the machine minder being referred to hereafter.

For the purpose of making our said invention better understood we describe with the aid of the accompanying drawings two machines which have been actually made but it is to be understood that these are merely described as showing certain methods of carrying out our invention and that our invention is in no way confined to the specific machines or to one containing all or any of the features therein described.

In the drawings:—

Figure 1 is a perspective view of a machine according to this invention and

Fig. 2 an enlarged detail view thereof.

Fig. 3 is a sectional side view of a further construction of machine according to this invention.

Fig. 4 a sectional plan view on line A—A of Fig. 3, and

Fig. 5 a front view partly broken away.

Figs. 6, 7, 8, 9, 10, 11 and 12 are detail views of the machine illustrated by Figs. 3 to 5.

Figure 1:
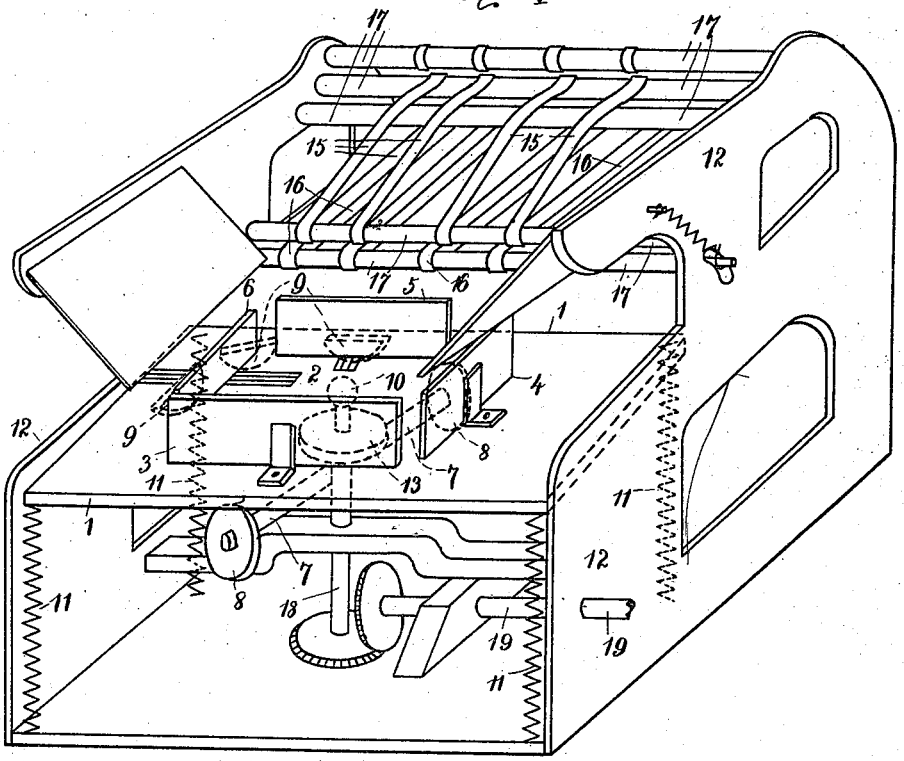
Figure 2:
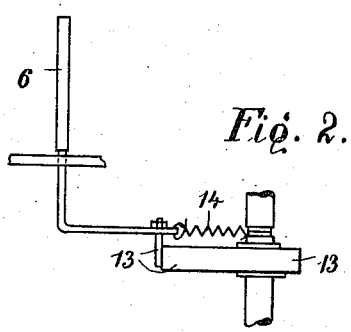
Figure 8:
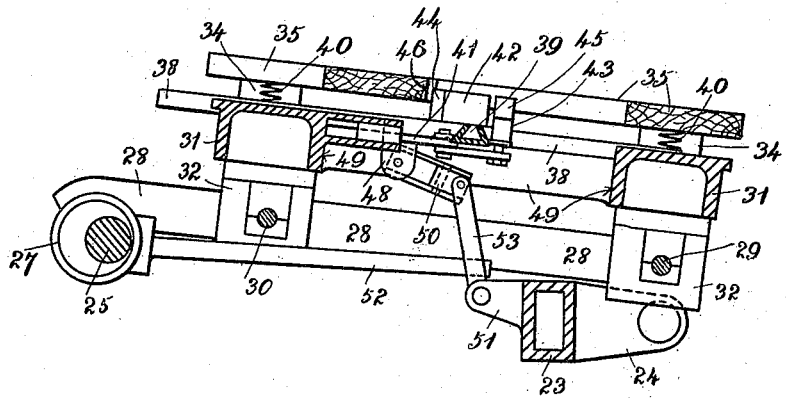
Figure 9:
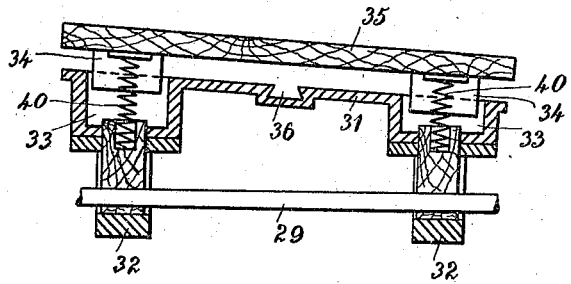
Figure 10:
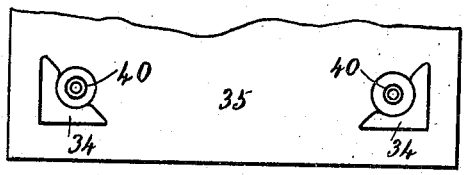

The machine illustrated by Fig. 1 comprises a table 1, which is maintained in constant vibratory or other comparable movement.

Vibrating table is preferably set or adjusted to have a general inclination downward toward one corner there being provided barriers or stops 3, 4 for the sheets as they drift down to this corner.

In combination with the above mentioned slope of the vibrating table, there is a pit 2 formed of sides all of which or but for preference as shown two of which 5, 6 have independent vibratory or beating motion whereby the formation of an even pile is facilitated. The vibration or motion of the table 1 is as shown such as results from the upward impulse on each corner or selected points in succession produced by a rotating head 7 underneath, the head 7 having one projection 8 which successively engages with or bears against projections 9 under the corners of the table 1. A device of more definite leading power consists of a rotating head under the table 1 the rotating head 7 having two rollers or wheels 8 on opposite parts of its diameter and these act in the following manner:

The table 1 is on a universal joint 10 and at the outset it may be regarded as horizontal under the corner corresponding to the lay sides or fences 3, 4 of the pit 2 and under the sides adjacent to this corner there are no projections, while there is a cam or projection 9 under the corner of the table corresponding to the open corner of the pit or the corner on which are movable jogging gages 5, 6, and there is also a cam projection 9 under each of the sides corresponding to this last mentioned corner.

The action of the revolving head 7 is now as follows:—

The revolving head 7 is secured to and revolves with the revolving shaft 18, which is driven by any suitable prime mover through the shaft 19.

As one of the two rollers 8 on the revolving head 7 engages successively on the series of three cams 9 under the higher corner of the pit there is a general sloping down of the table 1 toward the lay corner and this with a series of three jumps or impulses, the second roller 8 on the revolving head taking the blow or thrust caused by the forward tilting of the table 1. Next the second roller 8 on the revolving head 7 acts on the cams or projections 9 and the first roller 8 bears on the even face of the under side of the table.

Thus there is a production of a series of jerks which tend to lead the sheets down to the lay corner and the blow resulting from the roller leaving a cam or projection is emphasized by making the fall-off edge of the cam steep as shown and by the use of the springs 11 which pull under the table at the corners.

The tilting movements of the board 1 act also to cause the sheets or the like to move bodily or generally in their own plane.

If desired the table 1 can be further subjected to a blow or a series of blows which is or are delivered in a plane of the table. For this purpose an abutment or abutments which may be the side frames 12 of the machine is or are provided against which the side or sides or a corner or the corners of the vibrating table strikes by virtue of horizontal or substantially horizontal swinging movements about the universal joint 10; this blow or these blows being delivered in the plane of the table or in a plane which is substantially parallel to the plane of the table.

A highly sensitive condition, or live condition of the sheets is produced by the above described device so that apart from the tendency of the sheets to move toward the lay corner there is a ready response of the sheets to a reciprocating or tapping or jogging action of the gages or screens 5, 6 on the open sides of the pit 2.

A desirable reciprocating action of the joggers or the moving plates or parts which tap the sheets into position against the lay edges can be realized by such mechanical device as a cam and pin drive 13 for the outward movement and a spring action 14 for the inward movement, the cam and pin arrangement being such that the moving joggers work alternately, i. e., one is moving toward the sheets while the other is moving away from the sheets.

Figure 13:
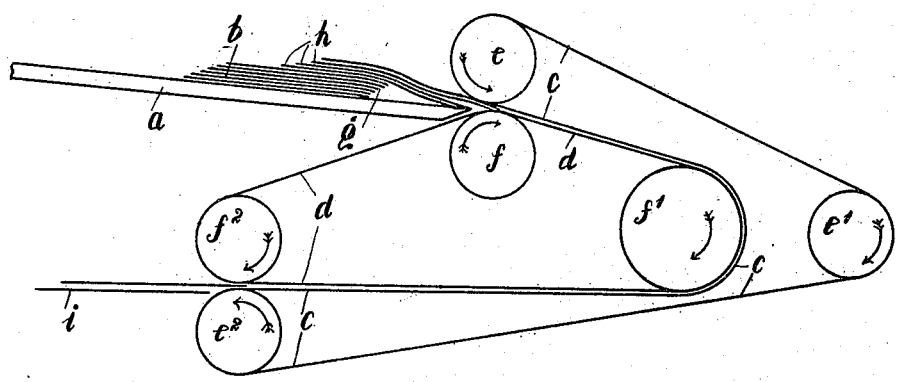
Figs. 13 and 14 depict two forms of sheet feeders which have been found to work well.
Figure 14:
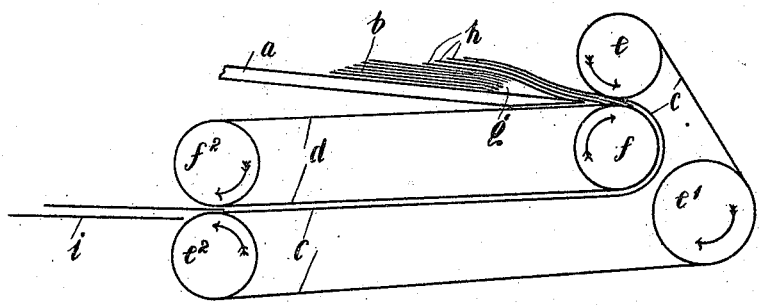

The preferred arrangement for feeding the sheets from a feed board is illustrated in Figs. 13 and 14. By this arrangement a rapid individual delivery or dropping of sheets from a pile is obtained with but a simple stroking action directed toward the taking in rollers to directly pass the sheet in stepped sequence between the taking in rollers with the leading sheet of any successive pair of sheets lying uppermost.

This is accomplished in said preferred arrangement by a sheet feeding apparatus formed so as to turn over the stepped sequence of sheets in the course of their travel to the delivery or knocking up board to render the leader of the successive and lapped sheets always the undermost sheet at the delivery end of the machine whereby such sheet is automatically freed from the succeeding sheets for individual delivery or dropping onto the knocking up board.

As depicted in the drawings (Fig. 13), $a$ designates a feed board for the reception of a pile of sheets $b$ to be individually delivered to the "knocking up" board and $c$, $d$ indicate a double endless blanket or band or tape carrier running over triads of rollers $e$, $e^1$, $e^2$ and $f$, $f^1$ respectively, the course of the carriers depicted being first away from the feed board or front of the machine and then returning toward the front of the machine where delivery is made at an appropriate point below the level of the feed board.

The companion rollers $e$, $f$, serve as the taking in rollers and the companion rollers $e^2$ $f^2$ as the delivery rollers.

For the purpose of realizing an easier sloping down of the sheets to the taking in rollers $e$, $f$ the pile $b$ is preferably bodily fanned out as shown, the leading sloped edge $g$ of the pile flexing or yielding toward the feed board more or less according to the weight of the paper.

Now by hand or mechanical stroking action on the trailing portions of successive sheets, this stroking being directed toward the taking in rollers $e$, $f$ the sheets are stepped forward as indicated at $h$ and passed directly in stepped sequence between the rollers $e$, $f$. The stepped sequence or stream of sheets is then gripped by the double blanket or band or tape system $c$, $d$, and is carried thereby around the roller $f^1$ to the delivery rollers $e^2$ $f^2$. Thus the top sheet at the receiving end is first taken in and is thereafter turned over, being thereby automatically freed from the succeeding sheets for individual delivery or dropping as shown at $i$.

The companion rollers and the blankets or bands or tapes will be arranged in well understood manner to hold the successive sheets with sufficient firmness to maintain the stepping during the carriage of the sheets thereby, and in the travel of the lapped sheets between the rollers any adhesions existing between the sheets would be broken by an arching of the paper.

Fig. 14 illustrates a more compact arrangement compared with that shown by Fig. 13, but functioning in exactly the same manner, the constructional difference being that the turn back of the endless blankets or their equivalent is effected about the roller $f$ and one roller, viz., $f^1$, is dispensed with.

In Fig. 1 a similar feeding of the sheets is indicated; these being fed from a suitably located feed board not shown between two endless traveling bands 15, 16, the system running around transverse and suitably revolved rollers 17, by which the sheets are inverted and caused to travel to the vibrating table 1 in the form of an overlapping stream of sheets. The bands 15, 16, can be tightened in any convenient manner, but preferably this is done by spring pressure. The rollers are preferably rotated in any convenient manner from the driving shaft 19.

The machine illustrated by Figs. 3 to 12 comprises a base 20 supporting a pair of side frames 21, 22 and at the front a cross member 23 having forwardly extending brackets 24 at each end is provided. A transverse driving shaft 25 driven from any suitable source of power is mounted in the frame and furnished with three eccentrics 26, 26, 27, the connecting rods 28, 28 of the outer eccentrics 26, 26 whereof are linked to the brackets 24, 24 of the cross member 23.

A pair of trasverse shafts 29, 30 are connected to or near to the forward and rear ends of the connecting rods 28, 28 respectively and carry a perforate table or frame 31 by means of four bearings 32 depending from the underside of the table, the arrangement being preferably such as to admit of a simultaneous lateral movement of the table 31.

On the rotation of the driving shaft 25 the lower table 31 will be moved back and forth longitudinally of the machine and in virtue of the eccentrics 26, 26 on the one hand and the linked connection of the eccentric connecting rods 28, 28 on the other hand the table will move in a vertical plane in a curved or partially curved path.

At the four corners the table is furnished with wells or boxes for the reception of stops furnished on the underside of an upper table or board 35 hereinafter referred to. The first mentioned or lower table 31 is further furnished with recesses 36, 37 preferably dovetailed arranged normal to each other and to adjacent sides of such table 31, for the reception of slides 38, 39 for the purpose presently referred to.

Cylindric spiral compression springs 40 are mounted preferably in wells 33 of the lower table 31 to support and carry the upper table 35, the lower ends of these springs 40 being secured in any suitable manner to the lower table 31 while the upper ends of the springs are fastened or secured in any suitable manner to the upper table or board 35. The upper table is thus vibratably and movably mounted on the lower table. In order to limit the movement of the upper table 35 in relation to the lower table 31 and secure the delivery of blows, or a jerking or sudden arrest of the upper table the underside of the latter is furnished with stops 34 which may be located adjacent to the springs 40 but arranged so as not to interfere with the action of the springs. These stops 34 fit into the wells 33 of the lower table 31 and are of such dimensions as to leave a clearance between the inner side walls of the wells 33 and the outer sides of the stops 34.

A suitable arrangement is provided for subjecting the upper table 35 alternately to longitudinal and lateral blows. A preferable arrangement is the following:

A horizontal bell crank lever 41 is pivoted to the lower table 31 and connected at its free ends to the dove-tailed slides 38, 39 before referred to each of these slides being furnished with strikers or fingers 42, 43 for alternately imparting longitudinal and transverse impulses to the upper table 35.

These strikers or fingers are preferably rubber-faced as shown at 44 and 45 respectively and strike against the sides 46 and 47 respectively of an opening in the upper table 35 or against suitable surfaces or stops on the underside of such table.

For the purpose of reciprocating the slides 38, 39 in the lower table 31 the longitudinally moving slide 38 has secured to its underside a lug 48 which projects through a slit or opening 49 in the lower table 31 and which is linked through a universal joint 50 and a link element 53 to a rearwardly extended bracket 51 fixed to the before mentioned cross member 23. A connecting rod 52 is secured to the medial eccentric 27 and the free end of this rod is pivotally connected to the link element 53 of such slide 38 so that on the rotation of the driving shaft 25, the link will be oscillated to thereby cause the slide 38 to move back and forth, and through the medium of the bell crank lever 41 the transverse slide 39 will also be reciprocated. Or if preferred the longitudinally moving slide 38 may be reciprocated from above the surface of the table.

The force of blows or the like delivered to the upper table 35 by the before mentioned strikers or fingers 42, 43 can be suitably regulated or modified. Conveniently such regulation or modification of the force of the blows or the like is afforded by adjustable slopes 54, 55 whereby the distance between the strikers or fingers 42 or 43 and the inner sides 46 or 47 of the opening of the upper table 35 or the said surfaces or stops can be increased or decreased as desired.

In addition to the longitudinal movement the lower table 31 is preferably also subjected to a lateral movement and for this purpose a bell crank lever 56 is fixed to one of the outer eccentric connecting rods 28, one end of the bell crank lever 56 being pivotally secured to the lower table 31 and the other end of the said lever being linked to the corresponding side frame or standard 22.

The upper table 35 is preferably given a slope to one corner to facilitate the movement of the sheets or the like toward this corner which is made the lay corner, it being desirable in such a case that the upper table 35 be supported by two or more springs 40 or a stronger unit spring at this corner, and in order to prevent undue movement of the table 35 springs 57 are provided, one end of each of which is secured to the upper table 35 and the other end to the lower table 31 or to the corresponding frames 21, 22 respectively.

A top board or plate 58 is fixed to the upper table 35 and is furnished with slots 59 for the reception of the dependent legs of a set of fences or joggers. Preferably two of the joggers 60, 61 are movable and two 62, 63 ordinarily the two constituting the lay edges are stationary. The stationary joggers 62, 63 are mounted on slides by means of which they may be fixed in any desired position, while the movable joggers 60, 61 project through the upper table 35 and are fixed to the slides 38 and 39 respectively of the lower table 31 and are moved toward or away from the center of the top board 58 by the movement of such slides in the lower table.

In order to insure a proper delivering of the sheets or the like an air-blast or air current may be introduced behind the sheets being delivered.

For this purpose one of the movable fences preferably the back fence 60 may be furnished with openings 64 through which air is blown toward the sheets. The means for producing the air blast conveniently comprises a fixed board 65 having an air inlet 66 and being in connection with the movable fence 60 by means of a bellows 67 so that on the inward movement of the fence 60 air is drawn between the fence and the stationary board 65 and on the outward movement of the fence air is expelled through the opening 64 in the fence.

A feed table 68 is fixed at or adjacent to the top of the side frames or standards 21, 22 from which the sheets or the like may be fed between two endless traveling bands 69, 70 according to the preferred arrangement hereinbefore set forth in detail, the system running around transverse rollers 71 by which the sheets are inverted and caused to travel to the top board 58 in stepped sequence for individual delivery. The bands 69, 70 can be tightened in any convenient manner, but preferably this is done by spring pressure. The rollers are preferably rotated from the driving shaft.

Briefly the operation of the machine is as follows:

The sheets are fed into the pit on the top board 58 formed by the fences 60, 61, 62, 63 by means of the traveling bands 69, 70 and are there subjected to wave vibrations to produce a highly sensitive condition or live condition or constant vertical tremor of the sheets, this being caused by the vibratory motion of the upper table 35 set up by the rapid series of blows imparted to the upper table both directly by the strikers or fingers 42, 43 and also by the rebounding action of the springs 40 supporting the upper table 35 on the lower table 31, which causes the stops 34 on the underside of the upper table to repeatedly strike against the sides of the wells 33.

Accompanying this vibratory motion of the upper table 35 is a general orbital or horizontal vibratory movement of the sheets in the plane of the table, this movement arising from the companion motions of the lower table.

With a machine constructed substantially as above described in detail according to Figs. 3 to 12 and with the sheets fed in the form of a stepped web and with the driving shaft driven at a speed of 80 revolutions per minute the knocking up, or dressing, or even piling of the sheets has been accomplished in a manner which surpasses anything which can be accomplished by hand labor. Thus the application of the method extends to the dressing of sheets for punching as in the manufacture of paper labels where the dressing of the sheets must be performed with special exactness.

The invention is applicable for use in producing an even piling of envelops, paper bags, sheets of cardboard and comparable flat objects.

It is to be understood that where we refer in the specification or claims to "knocking up" we mean a process for producing even piles of paper or the like whether such process is technically known as "knocking up" or otherwise, and where we refer to sheets of paper we also include like articles which may require to be evenly piled.

Having thus described our invention what we claim and desire to secure by Letters Patent is:—

1. In a device of the general nature of that herein described, in combination, supporting means providing a substantially even surface for a pile of sheets, a mounting for said supporting means adapted to permit to it an up-and-down vibratory movement, driving means, means driven from said driving means and adapted to impart to said supporting means a rapid vibratory movement, and means adapted to engage the edges of a plurality of sheets supported by said supporting means and direct them into registry.

2. In a device of the general nature of that herein described, in combination, a supporting member adapted to receive and support in substantially flat form, a pile of sheets, means adapted to subject said sheets to vibration in a direction transverse of their planes, and means adapted simultaneously to act upon certain edges of said sheets to force them into substantially registering position.

3. In a device of the general nature of that herein described, in combination, a supporting device provided with a pair of edge supports angularly disposed with respect to each other, said edge supports being adapted respectively to engage contiguous edges of the sheets of a pile upon said device and said device being downwardly inclined in the direction of the corner of said sheets formed by said contiguous edges, and means adapted to vibrate a pile of sheets mounted upon said supporting device.

4. In a device of the general nature of that herein described, in combination, a support adapted to receive a pile of sheets, means adapted to vibrate said support in an up-and-down direction, and means acting simultaneously with said vibration upon two contiguous edges of said sheets tending to force them into registry.

5. In a device of the general nature of that herein described, in combination, a support providing a substantially even surface for a pile of sheets, means adapted to vibrate said support flatwise, a plurality of devices respectively co-acting with two contiguous edges of a pile resting flatly on said support, and means adapted to impart vibratory movements to said devices.

6. In a device of the general nature of that herein described, in combination, means adapted to act upon a pile of sheets to maintain their surfaces out of exact parallelism, and means simultaneously tending to urge said sheets into registry.

7. In a device of the general nature of that herein described, in combination, a resiliently mounted support adapted to receive and support a pile of sheets, means adapted to vibrate said support and means adapted to act upon the edges of said sheets to tend to force them into registry.

8. In a device of the general nature of that herein described, in combination, a sheet support, a member upon which said support is resiliently mounted, means adapted to limit the relative movement of said support and said member, and means adapted to vibrate said member.

9. In a device of the general nature of that herein described, in combination, means adapted to support a pile of sheets of paper, means adapted to subject the pile to vibration in a direction transverse of the plane of the sheets, means adapted to engage one edge portion of said pile, and means adapted to impart an intermittent edgewise movement to the sheets while said vibratory movement is continued.

10. In a device of the general nature of that herein described, in combination, means adapted to support a pile of sheets of paper, a pair of members adapted respectively to engage contiguous edge portions of said pile, means adapted to subject the pile to vibration in a direction transverse of the plane of the sheets, and means adapted while said vibration is continued to impart intermittent edgewise movements of said pile relative to each of said members.

11. In a device of the general nature of that herein described, in combination, a support for a pile of sheets of paper, a pair of stops against which two contiguous edge portions of a pile on said support rest, means adapted to give said support intermittent movements in the directions of each of said stops, means adapted to vibrate said support in a direction transverse of the plane of the sheets of said pile, and means adapted to feed sheets in serial relation to said support.

12. In a device of the general nature of that herein described, in combination, means adapted to support a pile of sheets in a position with each of two contiguous edges downwardly inclined and its plane inclined to the vertical, means adapted to engage each of said edges, and means adapted to vibrate said pile in and up and down direction.

13. In a device of the general nature of that herein described, in combination, means engaging the lower flat surface of a pile of sheets in a position with each of two contiguous edges downwardly inclined and supporting the same by said lower surface and said edges, means adapted to engage each of said edges, and means adapted intermittently to tend to force together each of said engaging means and the edges with which it contacts.

14. In a device of the general nature of that herein described, in combination, a sheet support, a member upon which said support is resiliently mounted, means adapted to limit the relative movement of said support and said member in a direction edgewise of the sheets mounted thereon, and means adapted to vibrate said support in said edgewise direction.

15. In a device of the general nature of that herein described, in combination, a support, means adapted to feed onto said support a substantially alined series of overlapping sheets, and means adapted to act on the edges of a pile of sheets on said support to force them into registry.

16. In a device of the general nature of that herein described, in combination, a support, means adapted to feed onto said support a substantially alined series of overlapping sheets, means adapted to force each of the sheets of said series into a curved form before it reaches said support to break down adhesions between the sheets and means adapted to act on the edges of a pile of said sheets on said support to force them into registry.

17. In a device of the general nature of that herein described, in combination, means adapted to support a pile of sheets in a position with each of two contiguous edges downwardly inclined, means adapted to engage each of said edges, and means adapted to impart to a pile of sheets on said support an intermittent movement in a direction transverse to their planes.

18. In a device of the general nature of that herein described, in combination, means adapted to support a pile of sheets in a position with each of two contiguous edges downwardly inclined, means adapted to engage each of said edges, means adapted to impart to a pile of sheets on said support an intermittent movement in a direction transverse to their planes, and means adapted intermittently to tend to force together each of said engaging means and the edges which it contacts.

19. In a device of the general nature of that herein described, in combination, a sheet support, a member upon which said support is resiliently mounted, means adapted to limit the relative movement of said support and said member in a direction edgewise of the sheets mounted thereon, means adapted to vibrate said support in said edgewise direction, and means adapted to vibrate said sheet support in a direction transverse to the plane of the sheets mounted thereon.

20. In a device of the general nature of that herein described, in combination, a supporting member adapted to receive and support in substantially flat form a pile of sheets, means adapted to subject said sheets to vibration in a direction transverse of their planes, means adapted simultaneously to act upon certain edges of said sheets to force them into substantially registering position, and means adapted to feed to said supporting member a series of sheets in overlapped sequence.

21. In a device of the general nature of that herein described, in combination, a support adapted to hold a pile of sheets in a position with each of two contiguous edges downwardly inclined, means resiliently mounting said support, means adapted to engage each of said edges, means adapted to limit the relative movement of said support and the member on which it is mounted in a direction substantially edgewise of the sheets, means adapted intermittently to move said support in an edgewise direction, and means adapted to impart an up and down vibratory movement to the sheets upon said support.

In testimony whereof we affix our signatures in presence of two witnesses.

WILLIAM CHRISTOPHER AYLARD.
JOHN PAXTON PETTY.

Witnesses:
HERBERT WALTER MEADOWCROFT,
ALBERT Y. BARNES.

Copies of this patent may be obtained for five cents each, by addressing the "Commissioner of Patents, Washington, D. C."